United States Patent [19]

Frei

[11] 4,414,882
[45] Nov. 15, 1983

[54] PNEUMATIC DRIVE FOR SWITCHING ELEMENTS AND CONTROL ELEMENTS

[75] Inventor: Willi Frei, Sennwald, Switzerland

[73] Assignee: VAT Aktiengesellschaft für Vakuum-Apparate-Technik, Haag, Switzerland

[21] Appl. No.: 265,158

[22] Filed: May 19, 1981

[30] Foreign Application Priority Data

May 20, 1980 [DE] Fed. Rep. of Germany ....... 3019119

[51] Int. Cl.³ .............................................. F01B 3/10
[52] U.S. Cl. ...................................... 91/442; 91/451; 91/452; 251/25; 251/DIG. 1
[58] Field of Search ................. 91/268, 442, 451, 468, 91/452; 137/596.18; 251/25, DIG. 1; 277/3, 27, 29

[56] References Cited

U.S. PATENT DOCUMENTS 4,241,644 12/1980 Schertler ............................. 91/451
4,258,925 3/1981 Guyton ................................ 277/29

FOREIGN PATENT DOCUMENTS 2535524 2/1979 Fed. Rep. of Germany .
55-63055 5/1980 Japan .................................... 277/27

Primary Examiner—Robert E. Garrett
Assistant Examiner—Richard S. Meyer
Attorney, Agent, or Firm—Toren, McGeady and Stanger

[57] ABSTRACT

A pneumatic drive for actuating switchable devices such as valves and the like includes a cylinder and a cylinder base, the cylinder having an annular slot which extends in a plane transverse to the axis of the cylinder between an interior cylinder space and the outside. A piston is movable within the cylinder space and is connected to one end of a piston rod, the other end of the rod being coupled to the device to be actuated. A supply line communicates pressurized gas to the cylinder space to move the piston away from the cylinder base, while a spring biases the piston in the direction toward the cylinder base. An annular groove is formed in at least one of two annular surfaces which bound the annular slot in the axial direction, and a sealing ring is seated in the groove for axial movement so that the ring projects into the annular slot in response to pressurized gas communicated through a branch line into the closed end region of the groove. Accordingly, the sealing ring seals the cylinder space when the latter is pressurized by gas supplied through the supply line.

5 Claims, 2 Drawing Figures

PNEUMATIC DRIVE FOR SWITCHING ELEMENTS AND CONTROL ELEMENTS

BACKGROUND OF THE INVENTION

The present invention relates to a pneumatic drive for switching elements and control elements, for example, closures, valves, flaps, switches, signalers or the like.

The drive includes a piston which is movable in a cylinder, a piston rod which is connected to the piston and acts on the switching or control element which is to be activated, and at least one supply line for a compressed gaseous medium. This supply line charges into the cylinder from an opening near the cylinder base, and a valve is arranged in the supply line which valves closes or vents the supply line. The supply line has, between the valve and the opening in the cylinder, at least one branch line which opens into the closed end region of an annular groove provided in the cylinder. A sealing ring is received in the groove so that when the gaseous medium is discharged from the supply line to pressure the cylinder, the sealing ring is urged by the medium to seal the pressurized cylinder.

A pneumatic drive is known in which the groove which carries the sealing ring is provided in the inner cylinder wall, i.e., in the region over which the piston travels. When the cylinder is pressurized with the compressed medium, the sealing ring moves transversely of the direction of movement of the piston, and contracts against the piston. When the cylinder is relieved of pressure, the sealing ring which is of a soft rubber material is also urged outwardly, transversely to the direction of movement of the piston. The sealing ring must be suitably yielding and elastic so that it can perform these movements, and expand and contract to a sufficient extent. The gap which is opened by the sealing ring when the cylinder is depressurized is defined by the inner cylinder wall and the side wall of the piston and, consequently, has a relatively small cross section because this gap also determines the play between the piston and the cylinder wall, and it cannot be enlarged at random in view of maintaining correct guidance of the piston in the cylinder.

An object of the present invention is to provide a drive arrangement in which a vent may be formed as large as possible so that the cylinder can be quickly depressurized through the vent, without influencing the amount of play between the piston and the cylinder wall for guiding of the piston.

In addition, sliding friction developed by the sealing ring, which so far has resulted from relative motion between the sealing ring and the piston, is prevented with the object of increasing the service life of the sealing ring.

Another object of the invention is to manufacture the sealing ring of a material which is harder than the soft rubber used until now, so that it is possible to operate with higher differential pressures. This favorably influences the speed of the depressurizing process.

In accordance with the present invention, the cylinder has an annular slot which extends in a plane perpendicular to the axis of the cylinder, the slot being located in a region over which the piston travels, preferably close to the cylinder base. The slot leads from the interior cylinder space to the outside, and at least one of two annular surfaces which form the slot has the annular groove which opens toward the other annular surface and, which receives the sealing ring. The closed end region of the groove communicates with a supply line which can be connected to a supply of compressed gas or to the atmosphere.

The various features of novelty which characterize the invention are pointed out withe particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
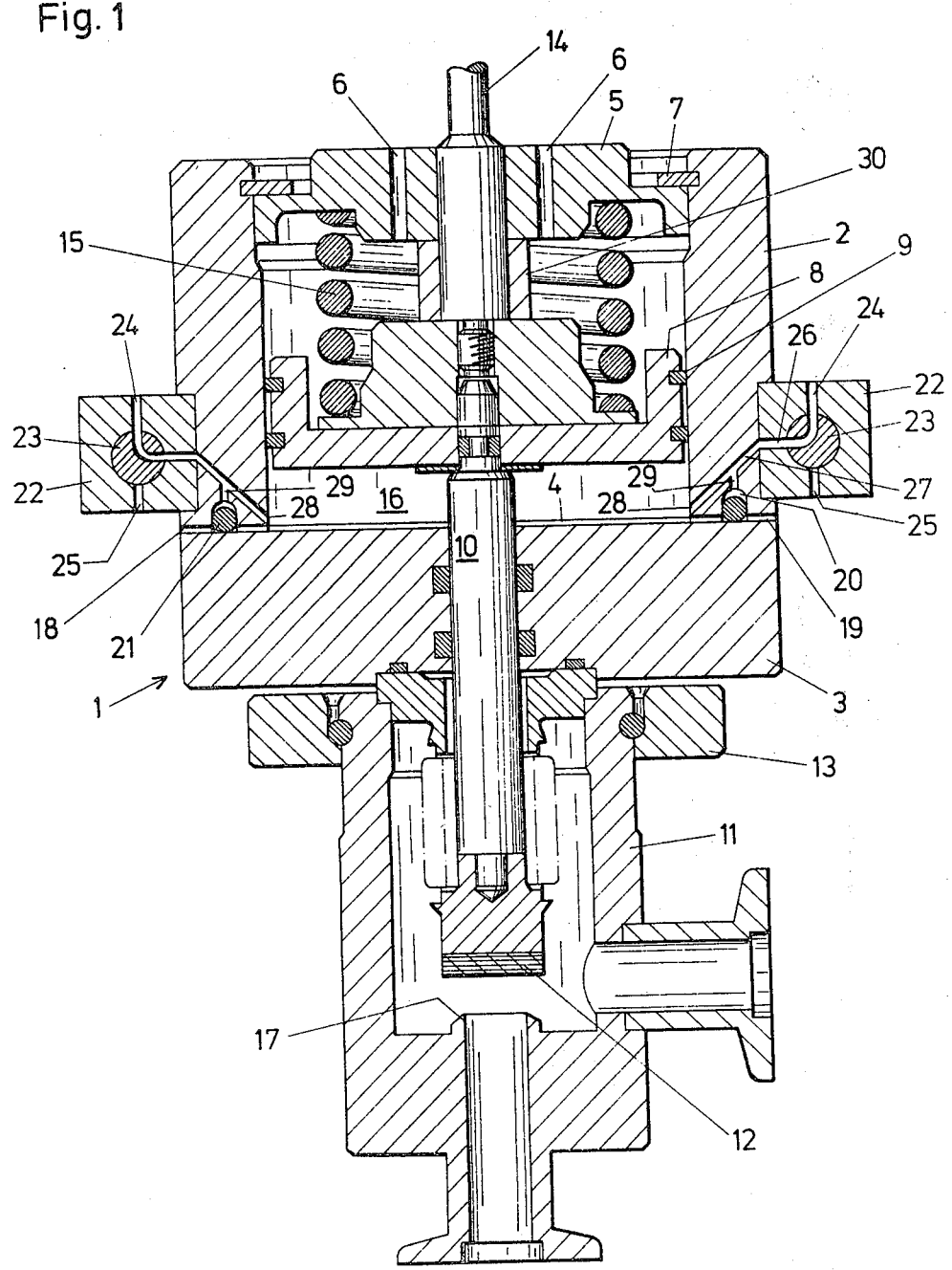
FIG. 1 is a longitudinal sectional view of a pneumatic drive according to the invention, showing an angle valve in an open position.
Figure 2:
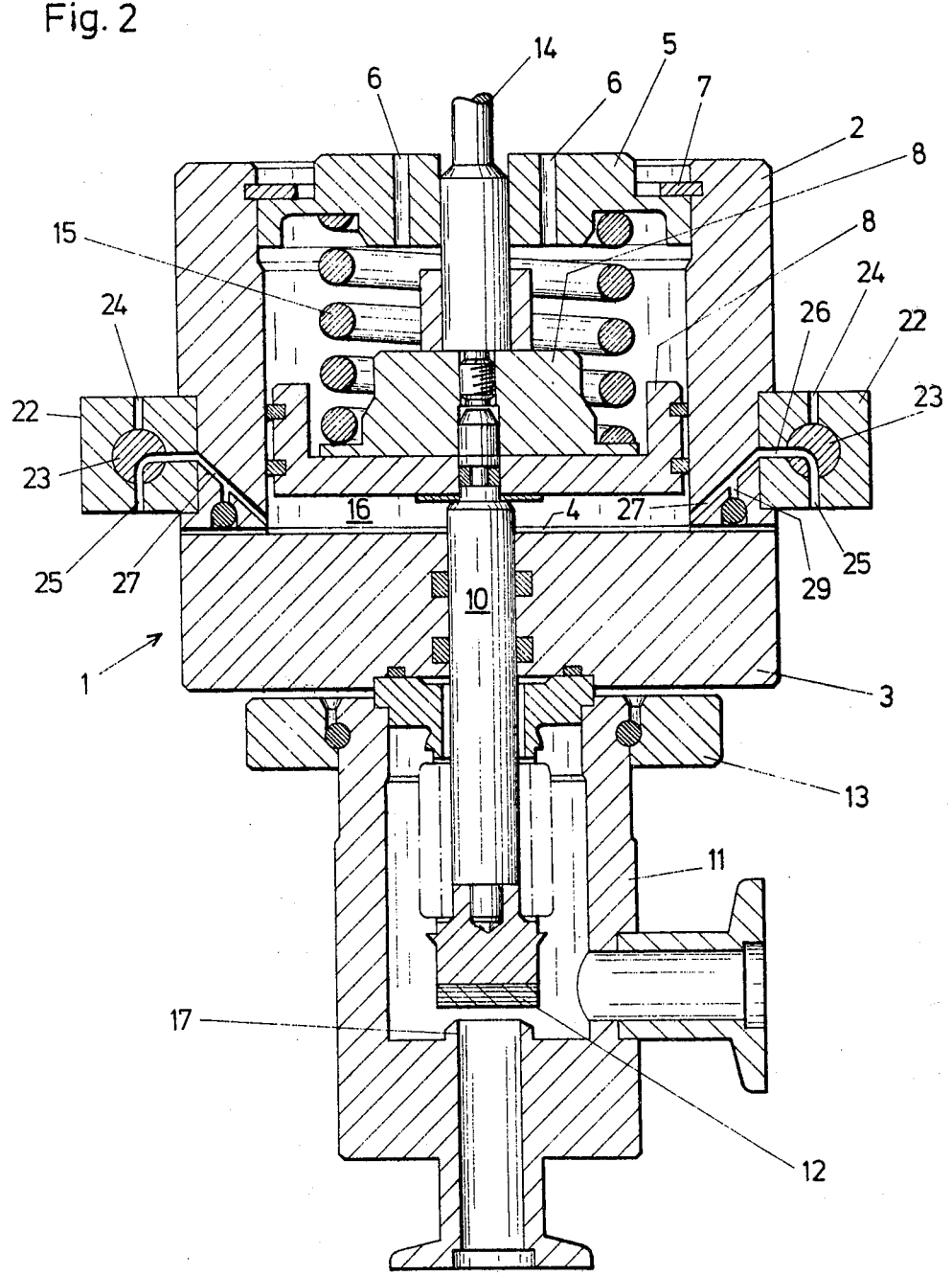
FIG. 2 is a longitudinal sectional view of the drive of FIG. 1, showing the drive cylinder as it is depressurized just before the angle valve is closed.

FIGS. 1 and 2 illustrate an embodiment of the invention for switching a quick acting angle valve.

The present pneumatic drive includes a cylinder 1 which comprises a cylinder shell 2 and a cylinder bottom or base 3. These two parts are connected to one another so as to form an annular slot 4. The slot 4 is formed by the cylinder base 3 and the cylinder shell 2 which are connected to one another by bolts (not shown) which extend parallel to the axis of the cylinder shell 2, so that the size of the slot is determined by spacers (not shown) into which the bolts are inserted.

The cylinder shell 2 is closed at the end opposite the base 3 by an insertable top wall 5 which has one or more vent openings 6. The insertable top wall 5 is fixed in position by a spring ring 7. A piston 8 with piston rings 9 is arranged for movement in the cylinder 1. A piston rod 10 is connected in a form-locking manner with the piston 8, and one end of the piston rod projects into a valve housing 11 of the angle valve. The piston rod 10 carries a valve disk 12. The valve housing 11 and the cylinder 1 are firmly connected with one another by a flange 13 and bolts (not shown). The other end 14 of the piston rod is guided out of the cylinder 1 and connected directly or indirectly with a position indicator (not shown) which indicates the position of the valve.

A helical spring 15 in the cylinder 1 is arranged coaxially with respect to the cylinder 1, and is supported at one end of the insertable top wall 5 and at the other end by the back of the piston 8, so that spring 15 presses the piston rod which in turn presses valve disk 12 against valve seat 17 when the cylinder space 16 is depressurized or vented. The force of the spring 15 determines the closing pressure of the valve.

The slot 4, which is located in a plane perpendicular to the axis of the cylinder 1 and which connects the cylinder space 16 with the outside atmosphere, is formed on one side by an annular surface 18 at the base end of the cylinder shell 2, and on the other side by an annular surface 19 which is formed around and extends radially inwardly fron the outer edge of the cylinder base 3. An annular groove 20 is worked into the annular surface 18 at the base end of the cylinder shell 2 and extends in the axial direction of the cylinder shell 2. The groove 20 opens towards the adjoining annular surface 19.

A sealing ring 21 of a material which is harder than the soft rubber material used in prior pneumatic drives is seated in the groove 20. The radial cross section of the sealing ring 21 is of a diameter somewhat larger than the breadth of the groove 20, so that the sealing ring contacts both side walls of the groove 20. The depth of the groove 20 is somewhat larger than the diameter of the sealing ring radial cross section, so that the sealing ring 21 can be completely received in the groove 20 without projecting into the slot 4.

Three-way valves 22 are fixed on the outer periphery of the cylinder shell 2. Two valves 22 are shown in the illustrated embodiment, however more than two valves 22 may be provided on the outer periphery. It is preferable that valve bodies 23, which form part of the valves 22, be controlled by way of solenoids (not shown). A first bore 24 of each valve 22 is connected with a compressed air source (not shown), and a second bore 25 of each valve 22 serves as a vent and leads directly to the atmosphere. A third bore 26 serves to communicate with the cylinder space 16 by way of a supply line 27 provided in the cylinder shell. The bore 26 also serves for depressurization of the cylinder space 16.

An orifice 28 of the supply line 27 is located close to the cylinder base 3. The supply line 27 has a branch line 29 which leads directly into the closed end region of annular groove 20. Preferably, the cross section of the branch line 29 is larger than that of the supply line 27. In addition, it is also preferable that the branch line 29 be shorter, i.e., of a lesser length, than the supply line 27.

Operation of the embodiment as described above will now be explained.

When the pneumatic drive is in the position shown in FIG. 1, the angle valve is open. The valve bodies 23 connect the compressed air lines 24 with the supply lines 27. The pressure which exists in the supply line 27 also exists in the branch lines 29, and urges the sealing ring 21 along its entire periphery out of the groove 20 in the axial direction of the cylinder, so that the sealing ring 21 is firmly pressed against the annular surface 19 of the cylinder base 3. As a result, the cylinder space 16 is sealed from the outside, and the supplied air pressure pushes the piston 8 upwardly against the action of the spring 15 so that the spring 25 is compressed. The passive movement of the piston away from the cylinder base 3 is limited by a spacer sleeve 30. The angle valve remains open (FIG. 1) as long as the cylinder space 16 is pressurized.

If the angle valve is to be closed, then the valve bodies 23 are rotated into the position shown in FIG. 2 by solenoids (not shown). The supply lines 27 and the branch lines 29 are connected with the atmosphere by the bore 25, and the pressure in the lines 27,29 diminishes.

Due to a differential pressure which is established momentarily by the lines 27,29 which communicate with the closed end regions of the groove 20, the sealing ring 21 is urged back within the groove 20 (FIG. 2), so that the pressure which developed in the cylinder space 16 can be dissipated primarily through the slot 4 which is now open. This process occurs extremely fast because, due to the fact that the sealing ring 21 is urged back within the groove 20, an opening which is extremely large compared to the cross sections of the bores 25 in the valves 22 is unsealed through which the compressed air is exhausted. The compressed spring 15 now urges the piston 8 downwardly and, thus, closes the angle valve. The process described above takes place within a few milliseconds.

It is also preferable that the groove 20 be provided at the outer radial regions of the annular surfaces 18,19, so that the annular cross section of the slot which is closed by the sealing ring 21 is further enlarged and depressurization of the cylinder space 16 occurs even faster. In the illustrated embodiment, the valves 22, the supply lines 27, the branch lines 29 and the groove 20 are arranged in or on the cylinder shell 2. However, these parts may also be arranged in the cylinder base 3 without impairing their operation. The slot 4 lies, in the illustrated embodiment, in the plane of the top surface of the cylinder base 3. It is also possible to move the slot 4 slighty upwardly.

As a result of the construction according to the invention, the sealing line 21 moves only in the axial direction. Consequently, the ring 21 is neither radially contracted nor expanded in its plane as is the case in the known arrangements until now. Also, the cylinder inner wall no longer contacts the moving sealing ring, thereby increasing the service life of the ring. Since the sealing ring need no longer change its radial dimensions, a material which is harder than the soft rubber material used previously may be used for the sealing ring 21, so that it is now possible to work with higher differential pressures. In spite of the constant slot width in the axial direction, the slot 4 increases in overall annular cross section per unit distance in the outward radial direction. This has a favorable effect on the speed of pressure reduction when exhausting the cylinder. It is also possible to produce the closing force for the valve, which is described as supplied by the spring 15, in another way, e.g., by a double-acting pneumatic cylinder or the like.

Another variation of the illustrated embodiment provides several grooves in one annular surface 18 or 19, or a number of grooves in both annular surfaces 18,19 which form the slot 4. In the latter case, the grooves may be located in a common plane or in planes which are offset with respect to one another. In the former case, the sealing rings are seated in the grooves so that they lie in contact with one another when the cylinder has been activated.

The pneumatic drive according to the invention has been described above in connection with an angle valve. The pneumatic drive may also be used for other control procedures, and can be used advantageously wherever extremely rapid closing speeds are required.

While specific embodiments of the invention have been shown and described in detail to illustrate the application of the inventive principles, it will be understood that the invention may be embodied otherwise without departing from such principles.

What is claimed is:

1. A pneumatic drive for actuating switchable devices such as valves and the like, comprising an axially extending cylinder and a cylinder base which together form a cylinder space in the interior of said cylinder, said cylinder having an annular slot which extends in a plane transverse to the axis of said cylinder between said cylinder space and the exterior of said cylinder closely adjacent said cylinder base, said annular slot being bounded in the axial direction by two opposed annular surfaces at least one of which is formed by said cylinder, a piston arranged for movement within said cylinder space in the axial direction of said cylinder, a piston rod connected to said piston for actuating a switchable device coupled at one end of said piston rod in response to movement of said piston, a supply line extending through one of said cylinder and said cylinder base and having an inner opening for communicating a pressurized gas to said cylinder space to move said piston away from said cylinder base, means for applying a bias force to said piston in the direction toward said cylinder base, valve means coupled to said supply line for venting said supply line to the exterior of said cylinder, a branch line connected at one end to said supply line between said inner opening and said valve means, an annular groove formed in one of the said annular surfaces so that said groove opens toward the opposed annular surface and extends in the axial direction of said cylinder to a closed end region, the other end of said branch line being connected to said closed end region of said annular groove, and a sealing ring coaxially seated in said annular groove for movement in the axial direction of said sealing ring and said cylinder to seal said annular slot when pressurized gas is communicated to said cylinder space and said branch line wherein said sealing ring is urged to project into said annular slot in response to pressurized gas which enters said end region of said annular groove from said branch line.

2. A pneumatic drive according to claim 1, wherein said cylinder base forms one of said opposed annular surfaces at a region which extends radially inwardly from the outer edge of said cylinder base.

3. A pneumatic drive according to the claim 1 or 2, wherein said annular groove is formed in the vicinity of the radially outer edge of at least one of said opposed annular surfaces.

4. A pneumatic drive according to claim 1, wherein said annular sealing ring is formed of a relatively hard rubber material.

5. A pneumatic drive according to claim 1, wherein the transverse cross section of said branch line is larger than that of said supply line so that a differential pressure is applied to said sealing ring when pressurized gas is vented from said cylinder space by said valve means which differential pressure urges said sealing ring in the direction toward the closed end region of said annular groove to open said annular slot wherein the pressurized gas is exhausted from said cylinder space through said annular slot.

* * * * *